May 24, 1938.  I. SATAKE  2,118,235
BROOM OR RAKE
Filed Dec. 5, 1936  2 Sheets-Sheet 1
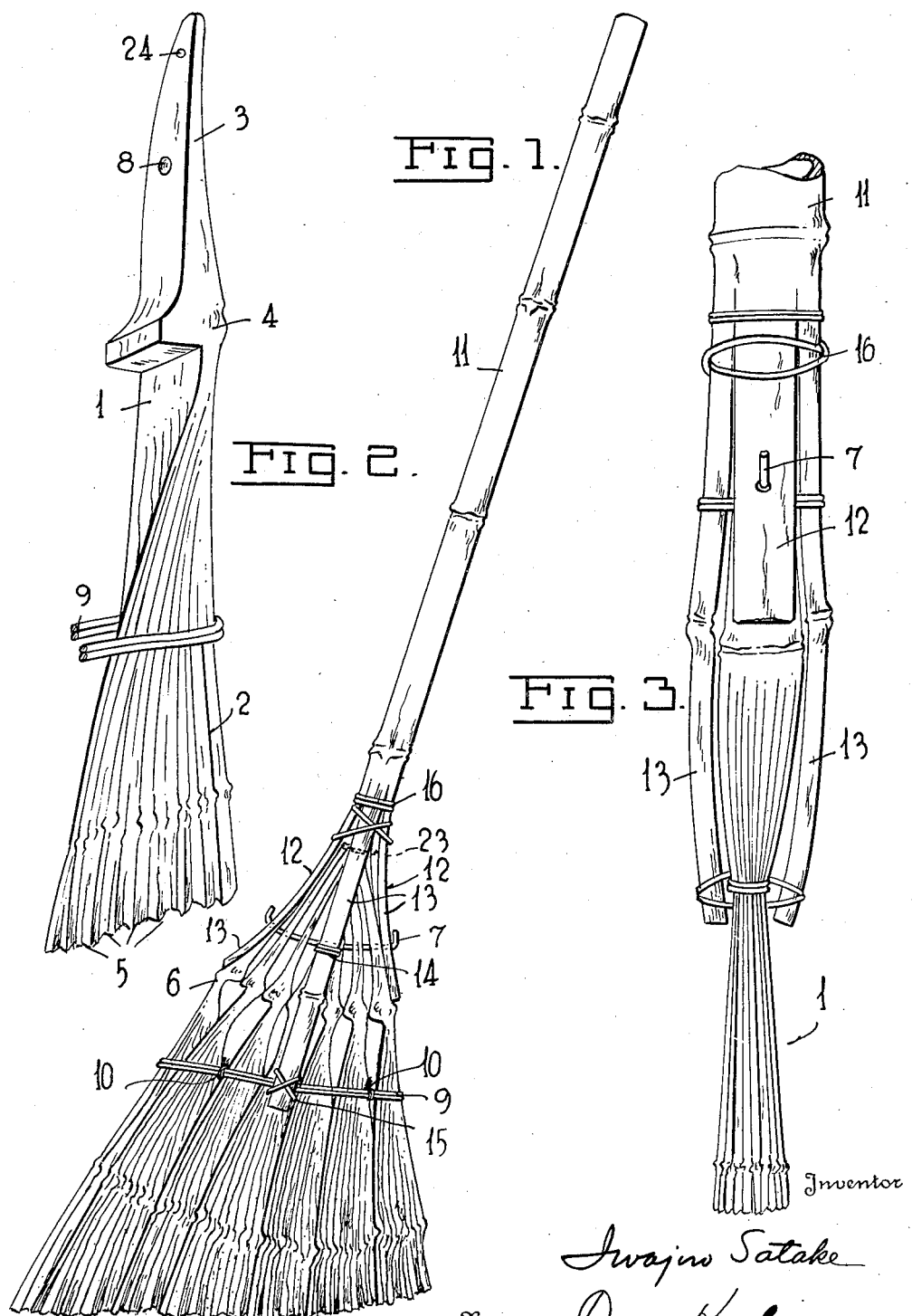

May 24, 1938.　　　　I. SATAKE　　　　2,118,235
BROOM OR RAKE
Filed Dec. 5, 1936　　　　2 Sheets-Sheet 2
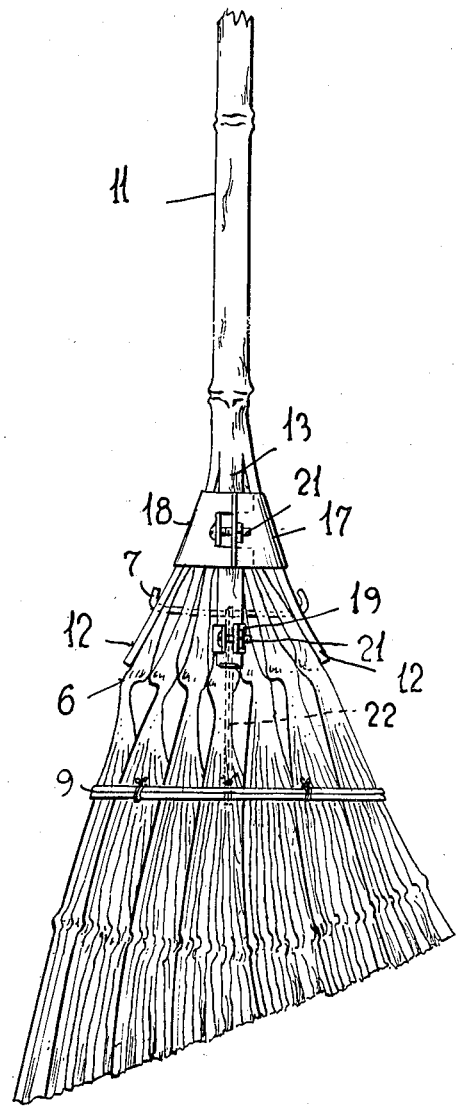
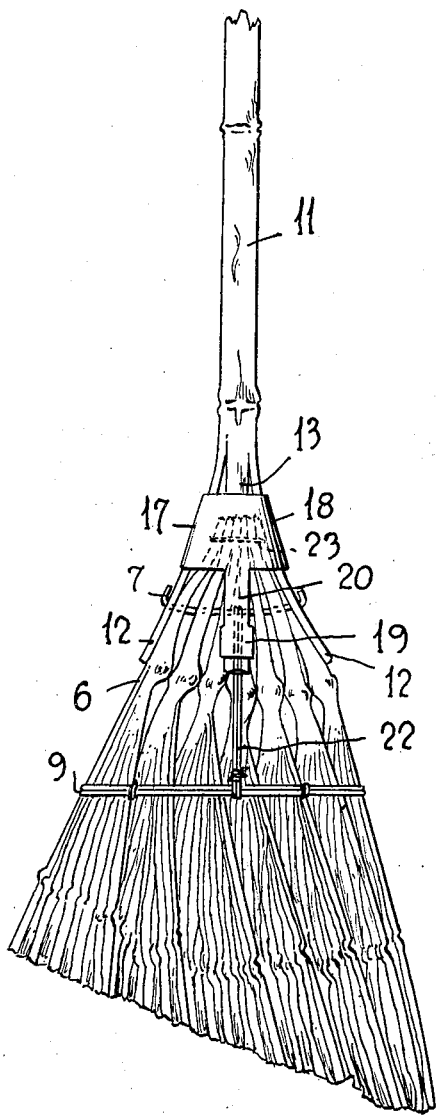

Patented May 24, 1938

2,118,235

UNITED STATES PATENT OFFICE 2,118,235

BROOM OR RAKE

Iwajiro Satake, Shibuya-ku, Tokyo, Japan

Application December 5, 1936, Serial No. 114,491

10 Claims. (Cl. 15—187)

My invention relates to brooms, rakes and the like, particularly those of the type which are useful in sweeping or raking comparatively large litter, especially leaves and comparable garden debris.

Important objects of the invention include the fabrication of the broom or rake out of inexpensive material associated in a unique, inexpensive and durable manner. In a preferred form of embodiment the broom or the like is made of bamboo material, the character of the construction lending itself with particular aptitude to certain natural characteristics of bamboo.

An important object of the invention is to provide an inexpensive, simple and durable broom or rake head comprising a plurality of bristle parts.

A further object of the invention resides in improving the individual head element, whereby the element is fashioned to include a plurality of bristle parts and is adapted to be associated with other similar elements to constitute a complete head.

A further object of the invention is the provision of a handle for a broom or the like, including a special disposition of one end of the handle which adapts it to receive and be readily and securely bound to the head of the broom or rake.

A further object of the invention is a novel and practical connection for the handle and head elements of a complete broom or rake.

Other and further objects and advantages of the structure contemplated by the present invention will appear as the description hereinafter proceeds.

In the accompanying drawings which form part of this application for Letters Patent and which illustrate the invention in certain preferred forms of embodiment, Figure 1 is a side elevational view on a reduced scale of a complete broom or rake including a head element and a handle element operatively secured together;

Fig. 2 is a perspective view on a relatively enlarged scale of one of the head elements;

Fig. 3 is an edge elevational view on the scale of Fig. 2 of the connecting zones of the head and handle;

Fig. 4 is a side elevational view of a modified construction; and

Fig. 5 is a view of the rear side of the construction shown by Fig. 4.

Referring now to the drawings, the head of the broom or rake comprises a plurality of individual elements formed as shown best in Fig. 2. Each element may conveniently comprise a section 1 of bamboo, although of course the element may be made of other material. Each element comprises a lower portion 2, an upper portion 3, and an intermediate portion 4. The lower portion 2 is split, cut, or otherwise divided to provide a plurality of tines or bristles 5, each extending from the free end of the lower portion 2 to the zone of the intermediate portion 4. The intermediate portion is made somewhat thicker than the lower portion, and the upper portion 3 is tapered or otherwise made somewhat thinner than the intermediate portion, particularly at the free end of the upper portion 3. When the element is made of bamboo, a section of the stalk including a joint or nodal portion is cut longitudinally, and from the arcuate or parti-cylindrical length thus provided an element 1 is fashioned by suitable cutting operations. The thickened joint or nodal portion is conveniently used to provide the relatively thick intermediate portion 4, and the division of the lower portion into bristles or tines is carried up to the region of the joint.

It will be evident that a plurality of elements 4, formed as shown in Fig. 2 and as just described, may be associated, as shown in Figs. 1, 4, and 5, in edgewise relation, with the thickened intermediate portions abutting and the relatively thin upper portions in contact, to provide a flaring or fan-shaped head having at its lower portion a multiplicity of bristles and terminating at its upper portion in substantially a blunt point. If the head be made of bamboo, the thickened intermediate portion will extend rather more from one side of the element, as is well shown in Fig. 1, and I prefer to have all the elements except one faced similarly, with the projecting portion of each element on the same side. The last element, which constitutes one of the extreme end elements, is oppositely faced, as is shown at 6 in Figs. 1, 4, and 5, so that both extreme end elements of the head present the outer surface of the bamboo to the exterior of the head.

In assembling the head a wire or similar tie 7 is passed through registering holes 8 in the upper portions of the element. These portions are placed under slight compression by the wire and the ends of the wire are fixed in any suitable manner, as by upsetting them. The lower portions of the elements are embraced by a flat loop 9 of wire or the like of sufficient stiffness to hold the bristles displaced in a flattened condition. The number of bristles formed in each element, and the relative thinness of the upper portion and thickness of the intermediate portion of each element are all so related that the spread of the divided lower portions is sufficient to dispose the multiplicity of bristles uniformly, so that the bottom edge of the head presents a multiplicity of fairly regularly spaced bristle ends, well adapting the broom or rake to efficient sweeping or raking operations. The loop 9 is maintained in its flat form by transverse ties 10 which connect opposite runs of the loop and pass between adjacent elements 1. It is believed that the structure of the head, as well as its advantages in simplicity and durability will be understood and appreciated from the foregoing description.

The handle 11 is formed of any appropriate rod-like material. Bamboo is especially suitable and is therefore preferred. A length of bamboo is cut longitudinally at one end along four more or less equally spaced lines, preferably up to the region of the joint. Four prongs are thus formed, and two opposite prongs 12 are spread apart to provide a skeleton socket into which the upper portion of the assembled head is inserted. The two prongs 12 are apertured in register with the aligned holes 8 of the head element and the wire or the like 7 is passed through these holes and suitably fastened on the outer sides of the two prongs. The two prongs 13 intermediate the two apertured prongs are bound to the head element or elements which lie immediately between them, as by a loop of wire or the like 14 which may be independent of or integral with the wire 7. An additional binding 15 of wire or the like may be used to connect the prongs 13 to the loop 9, and further splitting of the handle material at the upper end of the prongs may be prevented by a binding 16 of wire or the like.

It will be noted by reference to Fig. 1 that the prongs 13 are somewhat longer than the prongs 12. This difference in length is occasioned by the desirability of extending the prongs 13 to the region of the loop 9 to be bound thereto by the wire 15. It is of course not necessary to extend the prongs 12 further than a slight distance below the wire 7. The line of the projections in the intermediate portion of each head element forms a convenient end point for the prongs 12.

Figs. 4 and 5 illustrate an alternative mode of connecting the head and handle. In the construction there shown the head, which may be formed and assembled as has been explained, is inserted into a socket formed in one end of the handle element in the manner heretofore explained. A clamping element 17, formed of sheet metal or equivalent material, is specially shaped as shown in Figs. 4 and 5 to provide an upper clamping portion 18 and a lower clamping portion 19, connected by an intervening lengthwise strap portion 20. Each clamping portion has its opposite edges provided with apertured ears through which a bolt 21 may be passed to tighten the upper clamping portion around all the prongs and the inserted end of the head, and to tighten the lower clamping portion around the prongs 13 and the intervening head element or elements. Thus, the clamping portion 18 takes the place of the binding 16, and the clamping portion 19 takes the place of the binding 14.

A stiff wire 22 may be used to connect the loop 9 and the wire 7 to prevent displacement of the loop 9 longitudinally of the head, and a short stringer of wire or the like 23 may be passed through registering holes 24 in the extreme upper portion of each head element to hold the elements in assembled relation while the wire 7 is being passed through the openings 8 and the corresponding openings in the prongs 12. These details of the head assembly may be incorporated in the head whether the clamping means of Fig. 1 or Figs. 4 and 5 be used.

The lower ends of the bristles or tines may be trimmed at an oblique angle to the axis of the handle, as shown, and the bristles may of course be made as long or short as desired. When bamboo is used as the material for the head element 1 the presence of joints in the divided lower portions does not interfere with their division into bristles or with the quality or durability of the bristles.

It will be observed from the foregoing that the objects of the invention stated hereinabove are very completely realized by the constructions illustrated and explained. As has been stated, the broom or rake may be fabricated entirely of bamboo, or wood or other suitable material may be used. It is to be understood that the invention has been illustrated and explained in certain preferred forms of embodiment and that these embodiments are chosen for purposes of illustration and not limitation. The invention is capable of embodiment in other and further modified forms, and all such modifications, to the extent that they incorporate the principles of the invention as pointed out by the appended claims, are to be deemed within the scope and purview thereof.

I claim:

1. A broom or the like including a head comprising a plurality of individual elements, each element having integral lower, upper, and intermediate portions, the lower portion including a bristle, the upper portion being tapered, and the intermediate portion having a lateral projection, said elements being engaged together in their upper and intermediate portions.

2. A broom or the like including a head comprising a plurality of individual elements, each element having a lower portion including a bristle, a relatively thin upper portion, and a relatively thick intermediate portion, and means securing the upper portions together in converging relation, the intermediate portions of adjacent elements abutting and serving to space the lower portions in generally flaring relation.

3. A broom or the like including a head comprising a plurality of bamboo elements, each element having a lower portion divided into bristles, a relatively thin upper portion, and a portion intermediate the two named portions including a joint or nodal part of the bamboo constituting a lateral projection, and means securing the elements together with the upper portions converging and the lower portions diverging, spaced apart by engagement of said projections.

4. A broom head element consisting of an integral section of material having an elongated, wedge-shaped upper portion, a lower portion including a bristle, and an intermediate portion having a lateral projection extending from one face of the wedge-shaped portion.

5. A broom head element consisting of an integral section of bamboo having an elongated, wedge-shaped upper portion, a lower portion including a bristle, and an intermediate portion includng a joint or nodal part of the bamboo forming a lateral projection extending from one face of the wedge-shaped portion.

6. A broom or the like including a generally fan-shaped head having a converging upper portion and a handle having an end portion longitudinally divided to provide two pairs of opposed prongs, said prongs being spread apart, one pair being engaged with the side faces of the fan-shaped head and the other pair being engaged with the side edges of the fan-shaped head.

7. A broom or the like including a generally fan-shaped head having a converging upper portion and a handle having an end portion longitudinally divided to provide a plurality of prongs, said prongs being spread apart and receiving the upper portion of the head, and tying means secured to two opposite prongs and the intervening upper portion of the head and to other prongs intermediate the two named prongs, said tying means holding said prongs and head together.

8. A handle for a broom or the like comprising a length of generally rod-like material having an end portion longitudinally divided to form two pairs of opposed prongs, said prongs being spread apart, one pair being adapted to be engaged with the side faces of a fan-shaped broom head and the other pair being adapted to be engaged with the side edges thereof.

9. A broom or the like comprising a generally fan-shaped head consisting of individual elements assembled in upwardly converging relation, a handle comprising a rod-like member longitudinally divided at one end portion to provide a plurality of prongs, said prongs being spread and embracing the upper portion of the head, a clamp, conforming generally to the exterior contour of the engaged parts of the head and handle, engaged over said parts, said clamp comprising a sheet of material wrapped around said parts, and means preventing longitudinal movement of said clamp relatively to said handle and head.

10. A broom or the like as claimed in claim 1 in which each element is a section of bamboo, the lateral projection of each element being formed by a joint or nodal point of the bamboo, and said elements are secured together with the projections of adjacent elements in engagement to provide a fan-shaped head.

IWAJIRO SATAKE.